United States Patent
Kamo

[11] Patent Number: 5,790,164
[45] Date of Patent: Aug. 4, 1998

[54] IMAGE SCANNING AND WRITING APPARATUS WHICH USES DIFFERENT SYNCHRONIZING SIGNALS FOR SCANNING AND WRITING

[75] Inventor: Yasushi Kamo, Hachiooji, Japan

[73] Assignee: Ricoh Company, Ltd., Tokyo, Japan

[21] Appl. No.: 535,463

[22] Filed: Sep. 28, 1995

[30] Foreign Application Priority Data

Sep. 28, 1994 [JP] Japan .................. 6-233212

[51] Int. Cl.$^6$ .................. H04N 1/053
[52] U.S. Cl. .................. 347/250; 347/235; 358/409; 358/434; 358/410
[58] Field of Search .................. 347/250, 248, 347/235, 234, 411, 296, 434; 358/409, 410

[56] References Cited

U.S. PATENT DOCUMENTS

| | | | |
|---|---|---|---|
| 4,748,513 | 5/1988 | Yamada . | |
| 4,845,483 | 7/1989 | Negishi | 347/225 |
| 4,989,042 | 1/1991 | Muramatsu et al. . | |
| 5,091,789 | 2/1992 | Haneda et al. . | |
| 5,107,344 | 4/1992 | Nosaki et al. . | |
| 5,239,393 | 8/1993 | Takeuchi | 358/412 |
| 5,283,662 | 2/1994 | Nakajima | 358/409 |
| 5,375,001 | 12/1994 | Oh . | |
| 5,481,371 | 1/1996 | Kamon et al. | 358/410 |
| 5,526,128 | 6/1996 | Fujiki et al. | 358/444 |
| 5,610,651 | 3/1997 | Yamakawa et al. | 347/250 |
| 5,610,721 | 3/1997 | Higuchi et al. | 358/409 |
| 5,677,724 | 10/1997 | Takizawa et al. | 347/250 |

FOREIGN PATENT DOCUMENTS

| | | |
|---|---|---|
| 32 40 617 | 5/1983 | Germany . |
| 31 53 373 | 2/1994 | Germany . |

OTHER PUBLICATIONS

English Abstract of Japanese Publication No. JP 59-023965, Feb. 1984.
English Abstract of Japanese Publication No. JP 60-098458, Jun. 1985.
English Abstract of Japanese Publication No. JP 04-273754, Sep. 1992.
English Abstract of Japanese Publication No. JP 57-141648, Sep. 1982.

*Primary Examiner*—Peter S. Wong
*Assistant Examiner*—Derek J. Jardieu
*Attorney, Agent, or Firm*—Oblon, Spivak, McClelland, Maier & Neustadt, P.C.

[57] ABSTRACT

A method and apparatus which writes image information into a memory and reads the image information out of the memory using different synchronizing signals. A first synchronizing signal which is used to write scanned image data into the memory is generated to have a predetermined regularity, for example using a clock signal. The second synchronizing signal is based on an output of a photosensor which detects laser light reflecting off a polygonal mirror and is based on the rotating speed of the motor. The image information in the memory is read out in synchronism with the writing of the image information by the laser beam and polygonal mirror onto the photoconductive element using the second synchronizing signal. Therefore, it is not necessary for the polygonal mirror and the motor driving the polygonal mirror to be at a predetermined stable speed during the scanning operation.

19 Claims, 6 Drawing Sheets

IMAGE SCANNING AND WRITING APPARATUS WHICH USES DIFFERENT SYNCHRONIZING SIGNALS FOR SCANNING AND WRITING

BACKGROUND OF THE INVENTION

FIELD OF THE INVENTION

The present invention relates to an electrophotographic image forming apparatus such as a digital image forming apparatus. The invention further relates to an image forming method and apparatus which does not keep a polygonal mirror rotating at all times but has no or very small wait for the polygonal mirror to be brought to a stable rotating speed. The invention further relates to using a synchronizing signal based on a clock when writing image information to a memory when scanning, and using a synchronizing signal based on a rotating speed of the polygonal mirror when reading image information from the memory.

DISCUSSION OF THE BACKGROUND

In a digital copying machine, image data scanned from an original image can be easily processed and edited in various ways by a known image processing system. The digital copying machine typically includes an image memory having capacity of at least one frame of a recorded image in order for the digital copying machine to have high-speed copy operation.

The digital copying machine has a polygonal mirror which is rotated at a high-speed by a motor and deflects a laser beam issuing from a laser, so that the laser beam from the polygonal mirror is incident on a photoconductor. The motor of the polygonal mirror may make a loud sound which is unpleasant in an office environment. In order to reduce this problem, the motor of the polygonal mirror is stopped when the copy machine is not in operation. However, as it takes from about several seconds to several dozen seconds in order for the rotation of the motor to be brought to a predetermined stable speed from a zero speed, the first copy may be delayed in order to bring the motor up to speed.

Additionally, the above mentioned waiting time has been necessary because line synchronizing signals which are generated in synchronization with the rotation of the polygonal motor used to drive the polygonal mirror are supplied to a timing controller for the copier machine. These synchronizing signals cannot be properly generated until the motor's rotation has reached the predetermined stable speed and therefore, the copying operation including the scanning operation may not be able to begin until the motor speed becomes stable.

In order to shorten the above waiting time and to make the rotation of the motor stable in a rapid manner, there is a conventional copying machine which comprises an auto response sensor to detect the presence of an operator being proximate to the machine disclosed in Japanese Patent Laid-Open Publication (Kokai) No. 02-14177. In this machine, the motor of the polygonal mirror stops when the copy machine is not in operation. When the sensor detects the operator who is coming to the copying machine, the motor starts to rotate. Sometimes the sensor improperly detects a person who does not intend to make copies which causes the motor to be unnecessarily started and stopped. This generates unnecessary noise and reduces the life of the motor.

SUMMARY OF THE INVENTION

It is therefore an object of the present invention to provide an image forming apparatus having no waiting time in order to make a first copy.

It is a further object of the invention to provide an image scanning and writing device which uses different synchronizing signals for the scanning and writing operations.

It is yet a further object of the invention to provide an image scanning and writing device and corresponding method which uses a synchronizing signal based on a clock signal when writing image data to a memory during a scanning operation and a synchronizing signal generated based on an output from a photosensor which corresponds to the rotation of a motor driving a polygonal mirror when reading image information out of the memory when writing the image information onto a photoconductive element.

These and other objects are accomplished by an apparatus and method in which a first synchronizing signal having a regular pattern is generated using a clock signal. There is a scanning operation which scans a document and writes the image data representing the document into a memory using the first synchronizing signal.

A second synchronizing signal is generated using an output from a photosensor which is proximate to a photoconductive element. The output from the photosensor is dependent on the rotational speed of the motor which drives a polygonal mirror used to write image data onto a photoconductive element. Therefore, the second synchronizing signal cannot be used until the rotational speed of the motor and polygonal mirror becomes a stable predetermined speed. In order to read the image data out of the memory and to write the image data onto the photoconductive element using the laser and polygonal mirror, the second synchronizing signal is used to read the image data out of the memory in order for the information to be written onto the photoconductive element.

As the above device does not use a synchronizing signal during the scanning operation which is based on the rotation of the motor driving the polygonal mirror, it is not necessary for the motor and polygonal mirror to be rotating at the stable predetermined speed during the scanning operation. Therefore, the scanning operation may begin immediately after the print start key is pressed as its synchronizing signal is not based on the rotating speed. As the scanning operation is being performed, the motor is brought up to the predetermined stable speed so that when it is time to write the image information from the memory onto the photoconductive element, the motor will have reached the stable predetermined rotating speed and the second synchronizing signal based on the rotating speed of the motor and polygonal mirror can be properly used in order to read the image information out of the memory.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
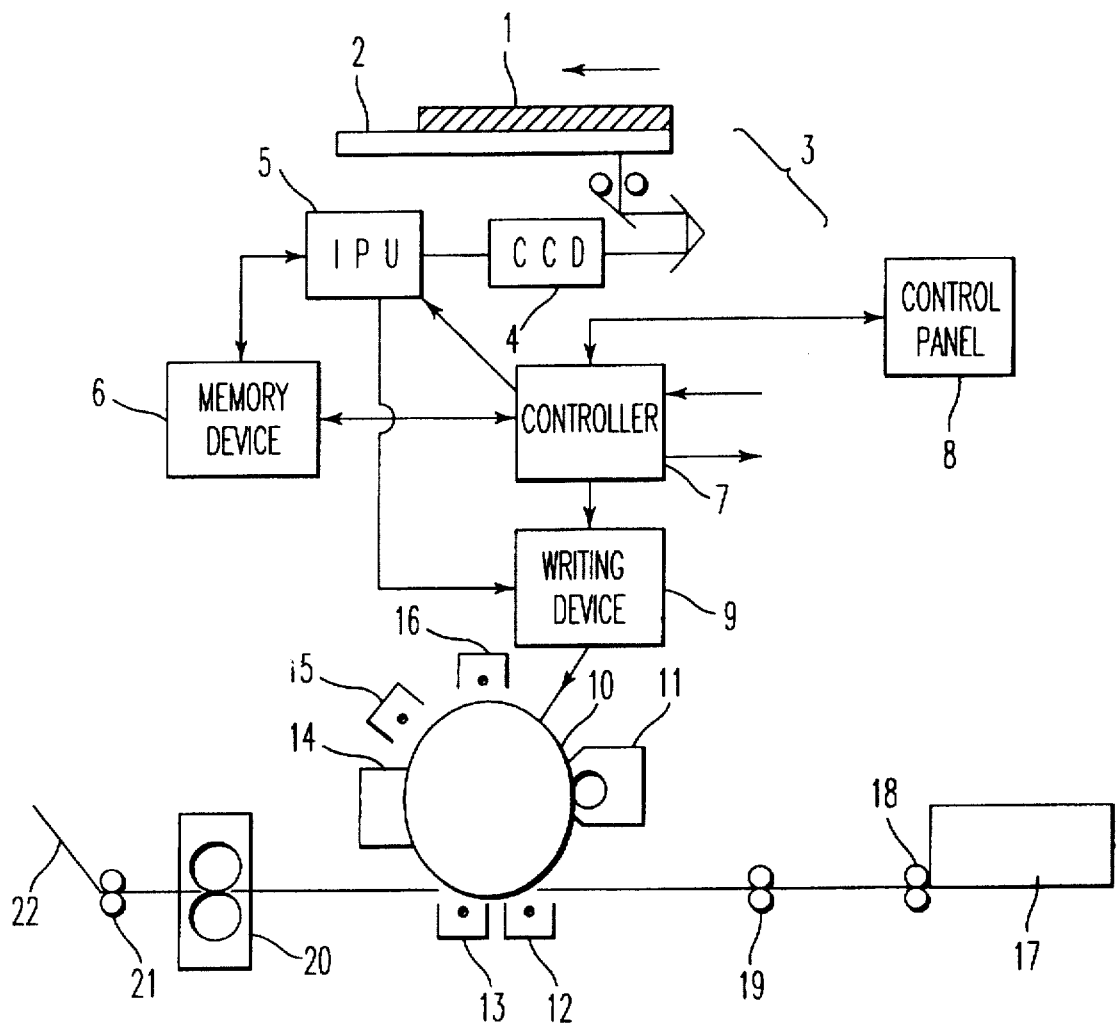
FIG. 1 is a vertical section showing a copier and control system the present invention.
Figure 2:
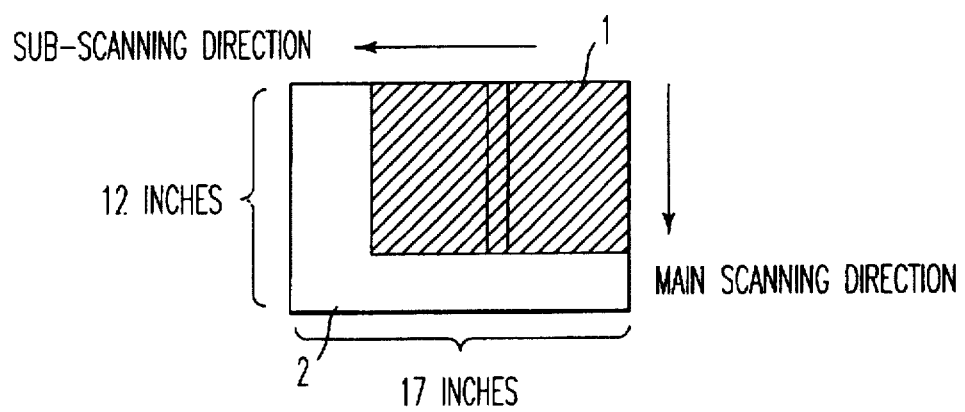
FIG. 2 illustrates a glass platen and demonstrates the main and sub-scanning directions.

Referring now to the drawings, wherein like reference numbers designate identical or corresponding parts and more particularly to FIG. 1, there is illustrated a copier embodying the present invention including a scanner 3 which scans a document 1 on a glass platen 2. The scanner 3, which has a lamp, mirrors, and lenses, is horizontally movable back and forth below the glass platen 11. As shown in FIG. 2, the glass platen has a 12 inch×17 inch area. The document 1 is set at a position shown in the FIG. 2. A sub-scanning direction is parallel to a long side of the glass platen 2, and a main scanning direction is parallel to a short side of the glass platen 2. The reflection from the document 1 laid on the glass platen 2 is incident to a photoelectric transducer 4. The photoelectric transducer 4 is implemented by a CCD (charge coupled device). An analog image signal from the CCD 4 is fed to an IPU (image processing unit) 5. The IPU 5 executes shading correction, A/D conversion (producing an 8-bits digital signal from an analog image signal), and various other kinds of processing including magnification changes and black-white reversal, if desired. The signals from the IPU 5 are fed to a memory 6 or a writing device 9 together with an image synchronizing signal. The kinds of image processings to be executed by the IPU 5 are determined by commands sent from a controller 7. Various kinds of signals from various kinds of sensors in the copier are fed to the controller 7, and the controller 7 controls the writing device 9 and the other driving devices. The writing device 9 includes a polygonal mirror rotated at a high speed by a motor to scan the drum 10 using a laser. A control panel 8 contains conventional control keys including a copy start key and also contains a display such as a LCD, CRT, and/or LEDs.

The laser beam from the polygonal mirror of the writing device 9 is incident on a photoconductive element implemented as a drum 10. The drum 10 is rotated by a motor during the course of a copying operation. A main charger 16 uniformly charges the surface of the drum 10 and an eraser 15 removes the charge from needless portions of the drum 10. Then, the laser beam from the writing device 9 illuminates the charged surface of the drum 10 to electrostatically form a latent image thereon. A developing device 11 develops the latent image to produce a toner image. Paper sheets in a paper cassette 17 are fed one by one to a set of register rollers 19 by set of pickup rollers 18. After the register rollers 19 have driven the paper sheet at a predetermined timing to an image transfer position, a transfer charger 12 transfers the toner image from the drum 10 to the paper sheet. Then the paper sheet carrying the image thereon has the charge thereof dissipated by a separation charger 13 and is thereby removed from the drum 10. A fixing device 20 fixes the image on the paper sheet and drives the paper sheet toward a set of discharge rollers 21 and ultimately to a discharge tray 22.

Figure 3:
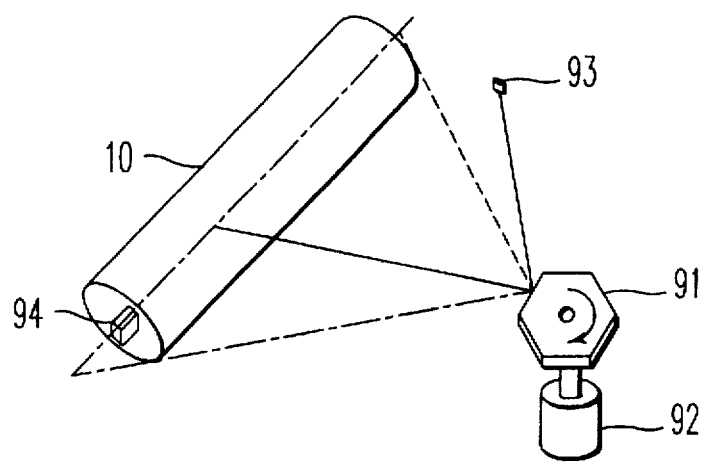
FIG. 3 illustrates laser/scanner mechanism of the writing device of FIG. 1.

FIG. 3 shows the laser/scanner mechanism of the writing device 9 of FIG. 1. The laser/scanner mechanism includes a laser 93 whose beam is modulated in accordance with image information to be imprinted on the paper. A polygonal mirror 91 is rotated by a motor 92 to deflect the laser beam issuing from the laser 93. The laser beam from the polygonal mirror 91 is incident on the photoconductor 10. A synchronizing optical sensor 94 is positioned beneath the photoconductor 10. When the beam is detected by the sensor 94, the sensor 94 provides a synchronizing signal (PMSYNC) indicative of the incidence of the beam in the main scanning direction. At this instant, pixels in the main scanning direction and those in the sub-scanning direction are respectively implemented by the deflection of the laser beam and the rotation of the photoconductor 10.

Figure 4:
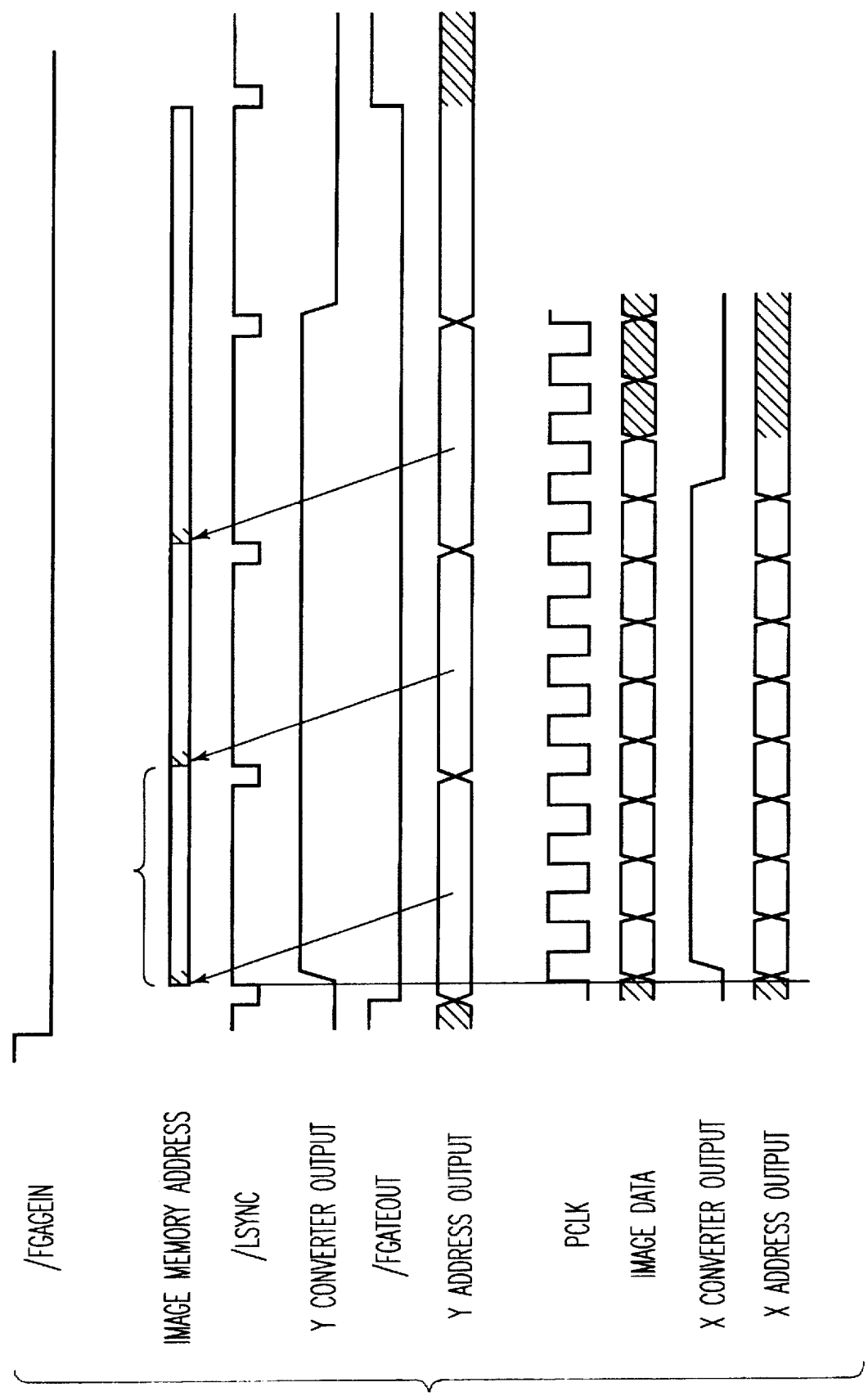
FIG. 4 is a timing diagram of the relations between the synchronizing and other signals.

Referring to FIG. 4, there is shown a timing diagram illustrating the relations between the synchronizing signals and other signals. A frame synchronizing signal /FGATEIN is indicative of an effective sub-scanning width of the video signal while serving as a sub-scanning synchronizing signal. When the signal /FGATEIN is at low which is an active level, image data or image signals are valid. The signal /FGATEIN is asserted (valid) or negated (invalid) by an edge signal which changes a line synchronizing signal /LSYNC from a high level to a low level. The signal /LSYNC is asserted by an edge signal which changes a pixel synchronizing signal PCLK from a low level to a high level. When the signal /LSYNC is asserted, image data or signals in a main scanning direction are valid.

Figure 5:
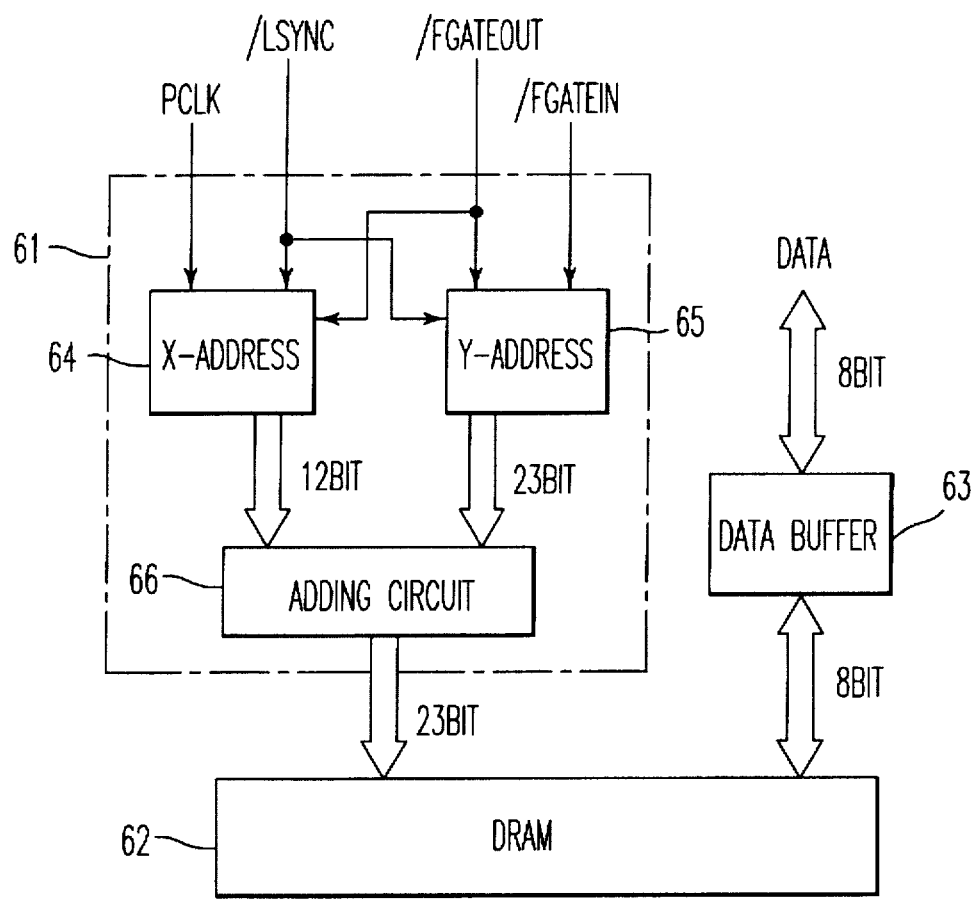
FIG. 5 is a block diagram showing the details of the memory device 6 illustrated in FIG. 1.

FIG. 5 is a detailed block diagram of the memory device 6 illustrated in FIG. 1. The memory device 6 comprises an address generating circuit 61, a DRAM (dynamic RAM) 62, and a data buffer 63. Additionally, the address generating circuit 61 includes an X-address generating circuit 64, a Y-address generating circuit 65, and an adding circuit 66 which combines X and Y addresses. The X-address generating circuit 64 generates addresses in the main scanning direction, and the Y-address generating circuit 65 generates addresses in the sub-scanning direction. Area information and the other information are input from the controller 7 to the X-address generating circuit 64 and the Y-address generating circuit 65, and the timing of these circuits 64 and 5 is controlled by the pixel synchronizing signal PCLK. A predetermined address within the DRAM 62 is assigned using a row address signal (RAS), a column address signal (CAS), and an address signal. The write image data or the read image data are stored in a predetermined address of the DRAM 62. The data buffer 63 has a function to determine the direction of the data flow.

The number of the pixels predetermined by the controller 7 are stored in the memory device 6, and the frame synchronizing signal /FGATEIN is used as a trigger signal when images are stored in the memory device 6. The predetermined number of the pixels both in the main scanning direction and in the sub-scanning direction are only to be sorted in the memory device 6. Consequently, data is set as a white when the frame synchronizing signal is shorter than the predetermined number of the pixels, or when the frame synchronizing signal is not active.

When the image data is read out of the memory device 6, IPU 5 decides that the frame synchronizing signals /FGATEIN is outputted to start a counter of the address generating circuit 61 for time equal to one cycle of the line synchronizing signal /LSYNC. The memory device 6 makes an output frame synchronizing signals /FGATEOUT active in synchronization with the pixel synchronizing clock signal PCLK and the line synchronizing clock signal /LSYNC which is always outputted from the IPU 5.

Figure 6:
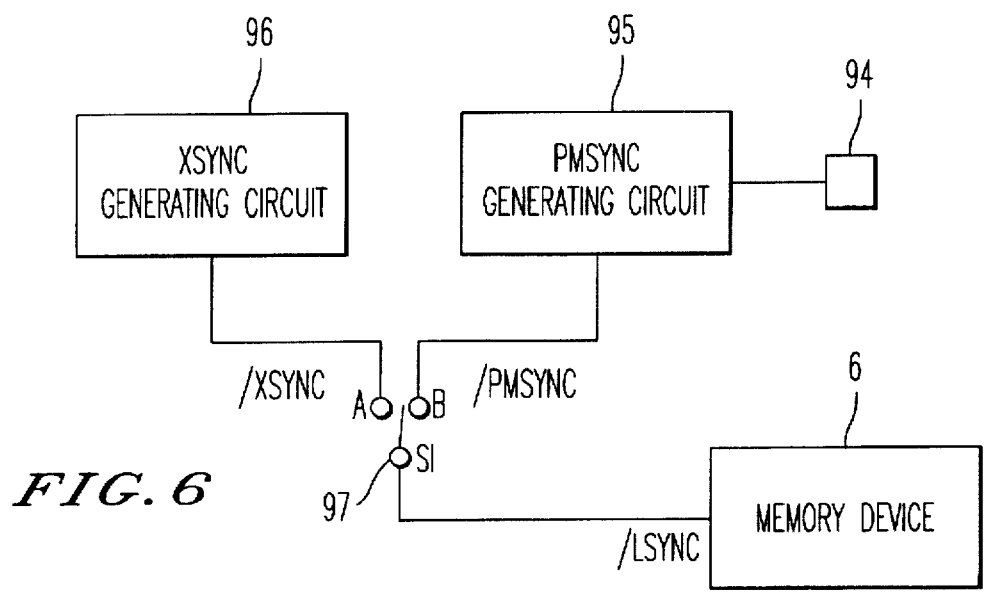
FIG. 6 is a block diagram of the hardware used to generate the line synchronizing signal.

FIG. 6 shows a block diagram of the hardware used to generate the line synchronizing signal /LSYNC used to write and read information from memory illustrated in FIG. 3. The optical sensor 94 is connected to a PMSYNC generating circuit 95. The output of the generating circuit 95 is connected to a contact point B of a switch 97. FIG. 6 shows a mechanical type switch, but an electronic type switch in which contact points are selected by the controller 7 can be also used. The other contact point A of the switch 97 is connected to an XSYNC generating circuit 96, illustrated in detail in FIG. 7. An output terminal of the switch 97 is connected to the memory device 6. The PMSYNC generating circuit 95 generates a first synchronizing signal PMSYNC, which is used on writing each main scanning line based on the detected signal of the synchronizing optical sensor 94 which is used as a reference. On the other hand, the XSYNC generating circuit 96 generates a second synchronizing signal XSYNC. The switch 97 selects one of the signal PMSYNC and the signal XSYNC, and the selected signal is transferred to the memory device 6 as the signal /LSYNC.

Figure 7:
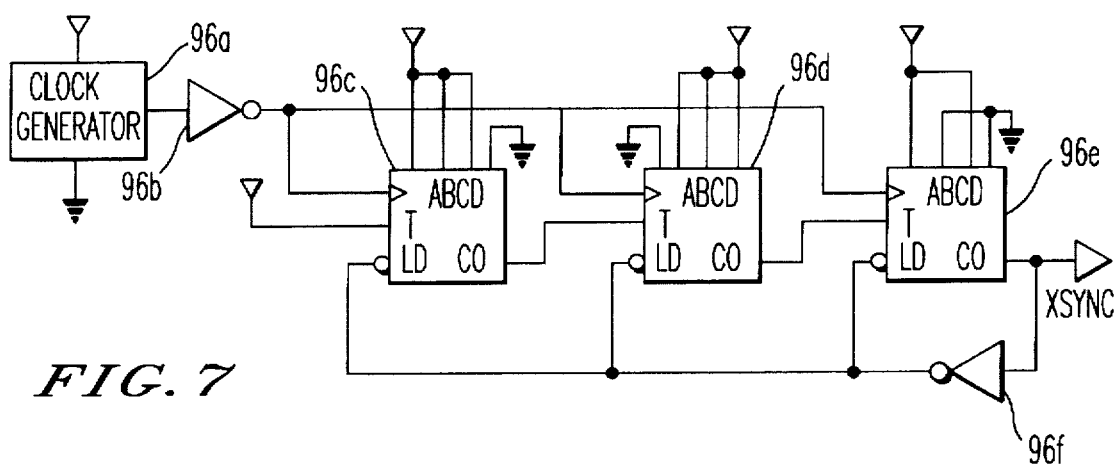
FIG. 7 shows details of the XSYNC generating circuit of FIG. 6.

FIG. 7 shows the details of the XSYNC generating circuit 96 of FIG. 6. A clock generator 96a generates a reference clock signal CLK which is output to an inverter 96b which produces an inverted signal. The inverted signal is sequentially supplied to a down-counter 96c, a down-counter 96d, and a down-counter 96e, respectively. An output signal from the down-counter 96e is the synchronizing signal XSYNC. The output terminal of the down-counter 96e is connected to an inverter 96f, and the output of the inverter 96f is respectively supplied to an LD terminal of each down-counter 96c, 96d and 96e. The LD terminal is used to signal that the value n is to be loaded.

The down-counters 96c, 96d and 96e start to down-count from a predetermined value n which is supplied to A, B, C and D terminals, as illustrated. When the counted value becomes zero, a carry-out signal CO is generated and the signal CO becomes the above mentioned synchronizing signal XSYNC. After the signal CO is valid, the signal is supplied to each LD terminal through the inverter 96f, and then the predetermined value n is loaded to each of the down-counter 96c, 96d and 96e again. Then the down-counters 96c, 96d and 96e start to down-count from the predetermined value n to zero again.

Figure 8:
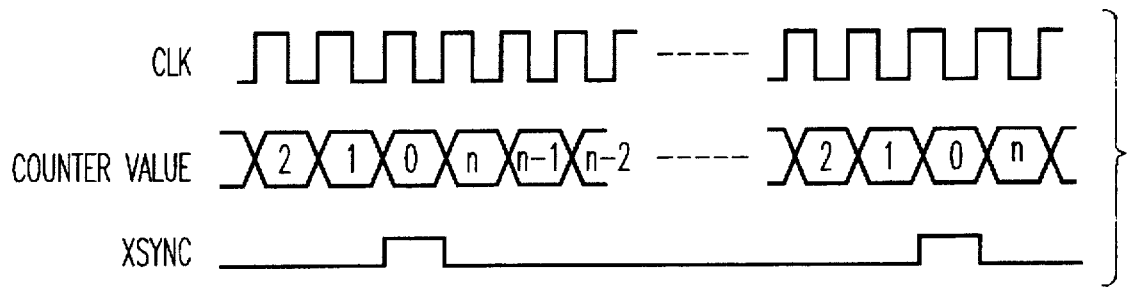
FIG. 8 is a timing diagram showing operation of the XSYNC generating circuit.

FIG. 8 is a timing diagram showing the reference signal CLK, the decremented counter value, and the synchronizing signal XSYNC. In this embodiment, the predetermined value n is designed by the hardware shown in the circuit of FIG. 7. However, it is also possible for the predetermined value n to be designed by a CPU which makes n easily changeable. It is also possible for a scanning pixel clock and a CPU clock to be used as the reference clock signal (CLK) instead of the clock signal from the clock generator 96 a.

Figure 9A:
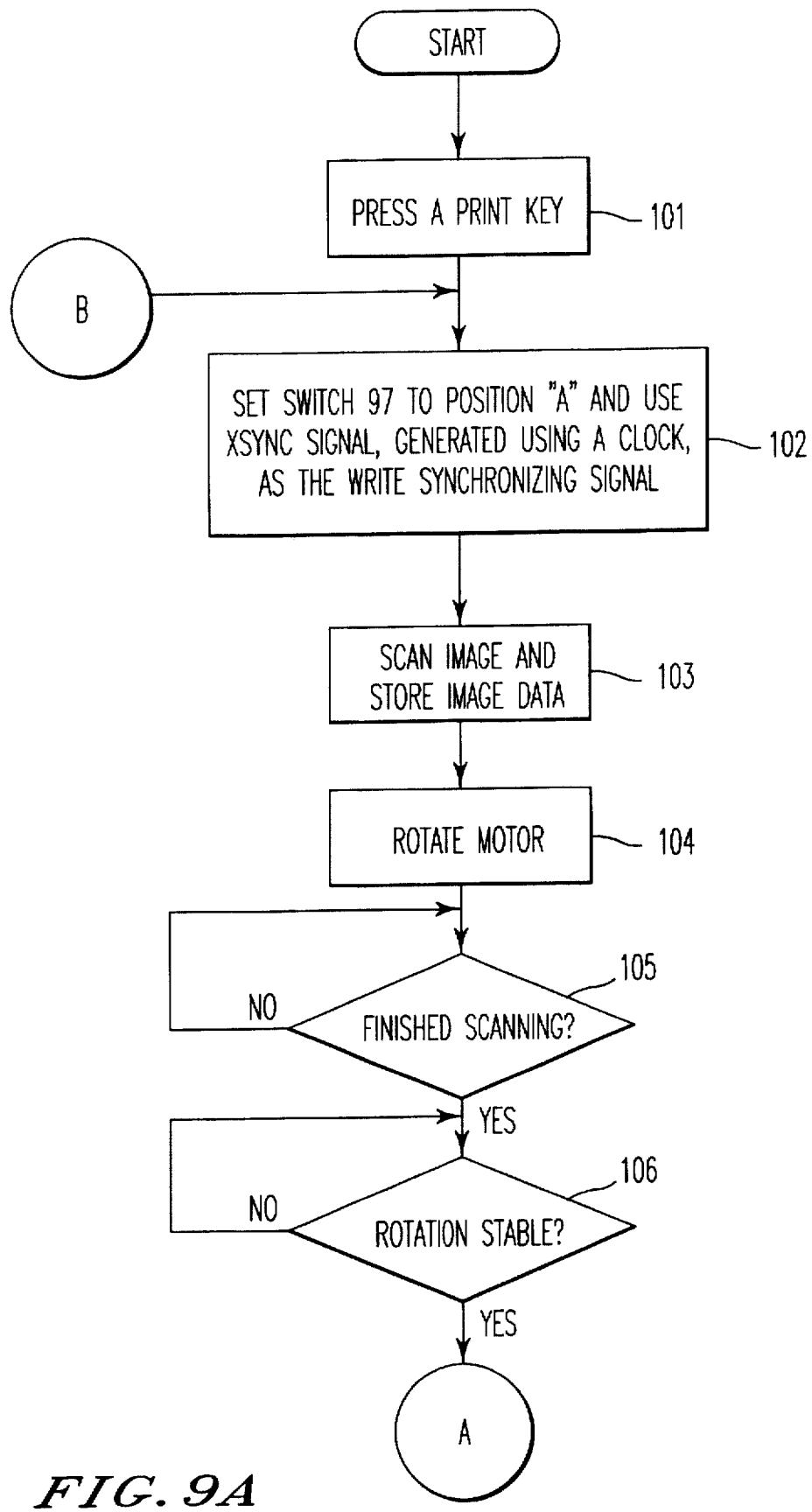
FIGS. 9A and 9B illustrate a flowchart of a read/write procedure of an image processor representative of an embodiment of the present invention.
Figure 9B:
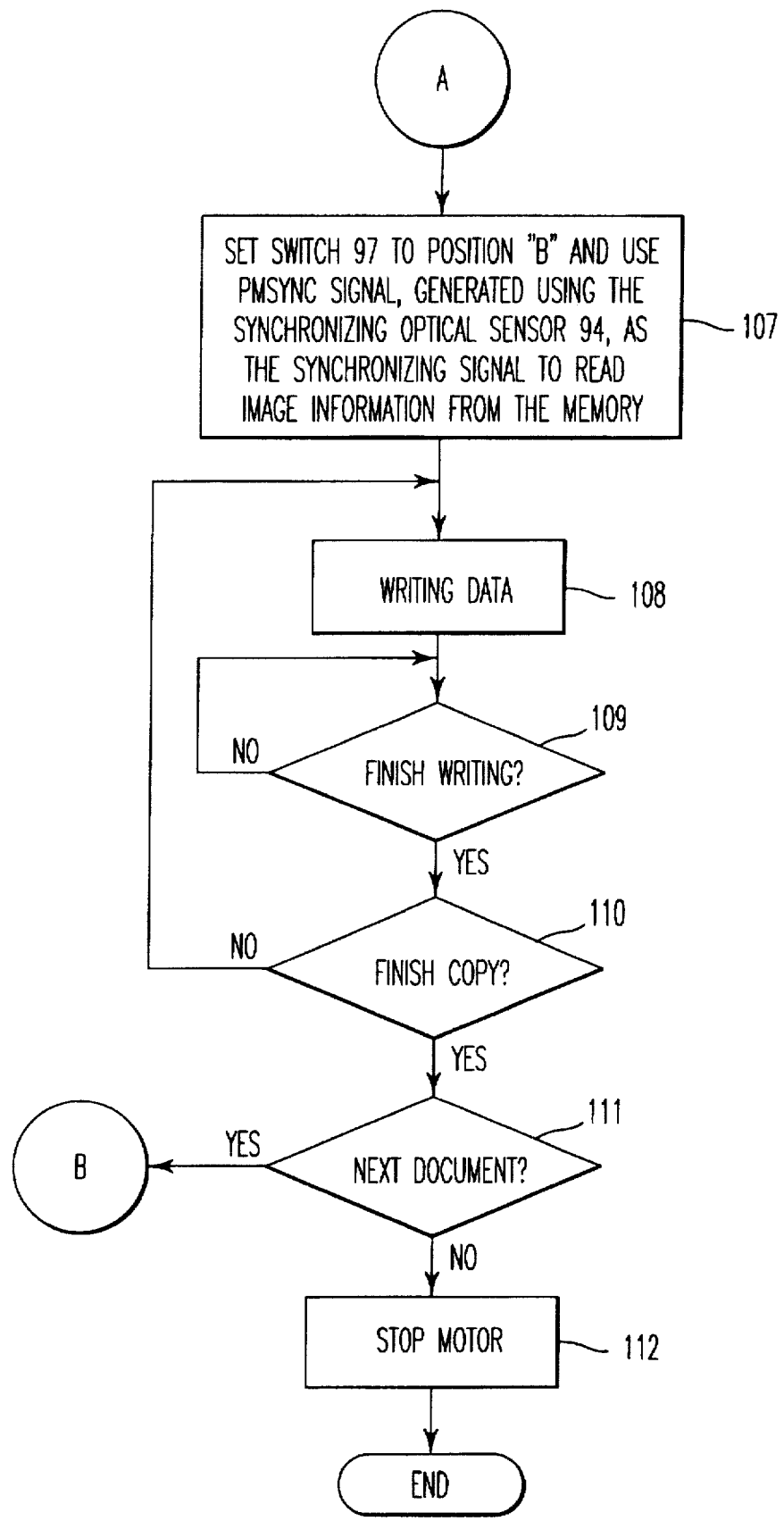

FIGS. 9A and 9B are a flowchart for explaining the read/write procedure of an image processor representative of an embodiment of the present invention. The original document 1 is set on the glass platen 2 and after the number of copies, magnification data, copy paper size information and other data are entered from the control panel 8, a print key is pressed, as indicated in step 101. The controller 7 changes the position of the switch 97 to select the terminal A which is connected to the XSYNC generating circuit 96 and the signal XSYNC which is generated based on a clock signal is transferred to the memory device 6 as the signal /LSYNC to synchronize the writing of scanned image data into the memory.

The scanning process is executed and the image data is stored in the memory device 6 in step 103 and the controller 7 commands the polygonal mirror 91 to start to rotate in step 104. If the scanning process has been finished (Step 105), then the controller 7 decides whether or not the rotation of the polygonal mirror 91 is stable in step 106. If the controller 7 decides that the rotation of the polygonal mirror 91 is stable, flow proceeds to process A illustrated in FIG. 9B.

In step 107 illustrated in FIG. 9B, the controller 7 changes the position of the switch 97 to select the terminal B which is connected to the PMSYNC generating circuit 95, which is generated based on the rotation of the polygonal mirror 91 and the signal PMSYNC is transferred to the memory device 6 as the signal /LSYNC to synchronize the reading of scanned image data output of the memory.

Then the laser beam from the writing device 9 starts to illuminate the surface of the drum 10 in step 108. When the laser beam has finished illuminating one page as determined by step 110, it is decided whether or not the predetermined number of copies have been made by step 110. If step 110 determines that all copies have been made, step 111 determines if another document is to be copied. If there is another document to be copied, flow proceeds to B illustrated in FIG. 9A. Otherwise, the motor is stopped in step 112 and the process ends.

Consequently, the polygonal motor 92 has been rotating only during time from scanning to writing, so that there is a limited time to rotate and make sound.

The present invention uses one or more microcomputers or control boards to perform the above-described functions. These microcomputers or control boards may be implemented using conventional microprocessors or a conventional general purpose digital computer programmed according to the teachings of the present application, as will be appropriate to those skilled in the art. Appropriate software coding can readily be prepared by skilled programmers based on the teachings of the present disclosure, as will be apparent to those skilled in the software art. The invention may also be implemented by the preparation of applications specific integrated circuits or by interconnecting an appropriate network of conventional component circuits, as will be readily apparent to those skilled in the art.

Additional details regarding the use of synchronizing signals in scanners and printers and the associated circuitry are found in the following U.S. Patents, each of which is incorporated herein by reference: 5,375,001 to Oh entitled "Method of and Apparatus For Producing Area Signals in Digital Image Processing System", 5,283,662 to Nakajima entitled "Image Reading Apparatus Controllable by External Apparatus", 5,107,334 to Nosaki et al. entitled "Image Forming Apparatus Having A Scanner", 5,091,789 to Haneda et al. entitled "Multicolor Image Forming Apparatus", 4,989,042 to Muramatsu et al. entitled "Image Synthesizing Apparatus", and 4,748,513 to Yamada entitled "Image Processing System".

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus, comprising:
   a scanner positioned below a glass platen, the scanner being movable back and forth, the scanner having a lamp, mirrors, and lenses;
   a photoelectric transducer optically connected to the scanner;

an image processing unit connected to the photoelectric transducer;

a memory connected to the image processing unit, the memory having a memory capacity of at least one frame of a recording image;

a writing device connected to the image processing unit and the memory, the writing device having a laser, a photoconductive element, a motor, and a polygonal mirror, rotated by the motor, from which a laser beam is reflected to the photoconductive element;

an optical sensor positioned proximate to the photoconductive element;

a first synchronizing signal generating circuit for generating a first synchronizing signal at a predetermined interval;

a second synchronizing signal generating circuit, connected to the optical sensor, for generating a second synchronizing signal using a signal received from the optical sensor;

a switch having two input terminals and an output terminal, one of the input terminals of the switch being connected to the first synchronizing signal generating circuit, another of the input terminals of the switch being connected to the second synchronizing signal generating circuit, and the output terminal of the switch being connected to the memory; and a controller, connected to the switch, for controlling the switch to connect said one of the input terminals to the output terminal whenever a scanning operation is being performed, and to connect said another of the input terminals to the output terminal during operation of the writing device, wherein the writing device always operates with the second synchronizing signal connected to the memory through said another input terminal of the switch, and the writing device only operates when the second synchronizing signal is stable, wherein the controller controls the switch to switch back to connect said one of the input terminals to the output terminal after the operation of the writing device in order to perform a subsequent scanning operation.

2. The image forming apparatus as claimed in claim 1, wherein the photoelectric transducer is a charge coupled device.

3. The image forming apparatus as claimed in claim 1, wherein the writing device further includes means for modulating the laser beam in accordance with image information to be imprinted on paper.

4. The image forming apparatus as claimed in claim 1, wherein the first synchronizing circuit includes a clock generator, and a down-counter connected to the clock generator.

5. An apparatus according to claim 1, wherein:

the controller uses the synchronizing signal on the output terminal of the switch for synchronizing a storing operation, a reading out operation, and a writing operation.

6. An apparatus according to claim 1, wherein:

the controller controls the switch to switch back to connect said one of the input terminals to the output terminal after a writing operation in order to perform a subsequent scanning operation without stopping rotation of the motor.

7. The image forming apparatus as claimed in claim 1, wherein the memory includes an address generating circuit, a DRAM having addresses at which image information is stored, and a data buffer.

8. The image forming apparatus as claimed in claim 7, wherein the address generation circuit includes an X-address generating circuit, a Y-address generating circuit, and an adding circuit which combines X and Y addresses.

9. A method for synchronizing a writing to and a reading of a memory, comprising the steps of:

generating a first synchronizing signal having a regular pattern;

scanning a document and writing image data representing the document into the memory using the first synchronizing signal;

generating a second synchronizing signal using an output from a photosensor which is proximate to a photoconductive element, the second synchronizing signal being different from the first synchronizing signal and generated using a rotational speed of a motor;

reading the image data out of the memory using the second synchronizing signal when the rotational speed of the motor becomes stable;

scanning a subsequent document and writing image data representing the subsequent document into the memory using the first synchronizing signal, wherein whenever the scanning step is performed, the first synchronizing signal is used to synchronize the writing of the image data into the memory.

10. A method according to claim 9, further comprising the steps of:

storing, reading out, and writing based on the synchronizing signal which is being used.

11. A method according to claim 9, wherein:

the step of scanning a subsequent document and writing image data representing the subsequent document into the memory using the first synchronizing signal is performed without stopping rotation of the motor between the step of reading and the step of scanning the subsequent document.

12. A method according to claim 9, wherein the step of generating the first synchronizing signal includes generating the first synchronizing signal using a clock signal.

13. A method according to claim 12, wherein the step of generating the second synchronizing signal includes reflecting a laser beam off of a rotating polygonal mirror onto the photosensor to generate the output of the photosensor.

14. A method according to claim 13, further comprising the step of:

writing the image data which has been read out of the memory using the laser beam which is reflected off of the rotating polygonal mirror.

15. A method according to claim 14, further comprising the step of:

beginning the rotating of the polygonal mirror by starting the motor such that when the scanning step begins to be performed, the step of generating the second synchronizing signal is not properly generating the second synchronizing signal because the rotating speed of the polygonal mirror is not at a stable predetermined speed.

16. An image processing apparatus, comprising:

a scanner for scanning a document to be copied;

a photoelectric sensor optically connected to said scanner;

an image processing means connected to said photoelectric sensor;

memory means connected to said image processing means;

writing means connected to said image processing means and said memory means, said writing means including a photoconductive element, a motor and a polygonal mirror driven by said motor from which mirror a laser beam is reflected to the photoconductive element;

an optical sensor positioned proximate to the photoconductive element, a first synchronizing signal generating circuit for generating a first synchronizing signal at a predetermined interval;

a second synchronizing signal generating circuit, connected to the optical sensor, for generating a second synchronizing signal using a signal received from said optical sensor;

a controllable switching means connected to said first synchronizing signal generating circuit to select one of said synchronizing signals; and a control means, connected to the controllable switching means, for selecting said first synchronizing signal using the controllable switching means whenever the scanner is scanning a document, and for selecting said second synchronizing signal for reading out information from said memory means which is written by said writing means, when the rotational movement of said polygonal mirror is stabilized;

wherein the control means controls the controllable switching means to select said first synchronizing signal after a writing operation in order to perform a subsequent scanning operation.

17. An apparatus according to claim 16, wherein:

the control means controls the controllable switching means to select said first synchronizing signal after a writing operation by said writing means in order to perform a subsequent scanning operation without stopping rotation of the motor.

18. A method for synchronizing a writing to and a reading of a memory, comprising the steps of:

generating a first synchronizing signal having a regular pattern;

scanning a document and writing image data representing the document into the memory using the first synchronizing signal;

generating a second synchronizing signal using an output from a photosensor which is proximate to a photoconductive element, the second synchronizing signal being different from the first synchronizing signal and generated using a rotational speed of a motor;

reading the image data out of the memory using the second synchronizing signal;

scanning a subsequent document and writing image data representing the document into the memory using the first synchronizing signal, wherein whenever the scanning step is performed, the first synchronizing signal is used to synchronize the writing of the image data into the memory, and wherein the controller controls the switch to switch back to connect said one of the input terminals to the output terminal after a writing operation in order to perform a subsequent scanning operation.

19. A method according to claim 18, wherein:

the step of scanning a subsequent document and writing image data representing the subsequent document into the memory using the first synchronizing signal is performed without stopping rotation of the motor between the step of reading and the step of scanning the subsequent document.

* * * * *